US007587126B2

(12) United States Patent
Okamoto et al.

(10) Patent No.: US 7,587,126 B2
(45) Date of Patent: Sep. 8, 2009

(54) VIDEO INFORMATION OUTPUTTING APPARATUS, VIDEO INFORMATION RECEIVING APPARATUS, VIDEO INFORMATION OUTPUTTING METHOD AND VIDEO INFORMATION TRANSMITTING METHOD

(75) Inventors: Hiroo Okamoto, Yokohama (JP);
Nobuaki Kabuto, Kunitachi (JP);
Hitaoki Owashi, Yokohama (JP);
Atsushi Yoshioka, Ebina (JP)

(73) Assignee: Hitachi, Ltd., Tokyo (JP)

( * ) Notice: Subject to any disclaimer, the term of this patent is extended or adjusted under 35 U.S.C. 154(b) by 1194 days.

(21) Appl. No.: 10/100,484

(22) Filed: Mar. 14, 2002

(65) Prior Publication Data

US 2003/0086695 A1    May 8, 2003

(30) Foreign Application Priority Data

Nov. 8, 2001  (JP) .............................. 2001-342658
Nov. 30, 2001 (JP) .............................. 2001-365534

(51) Int. Cl.
*H04N 5/91*  (2006.01)
(52) U.S. Cl. ............................. 386/94; 380/201; 380/60
(58) Field of Classification Search .................. 386/94;
360/60; 380/201
See application file for complete search history.

(56) References Cited

U.S. PATENT DOCUMENTS

| 5,574,787 | A | 11/1996 | Ryan |
| 5,778,140 | A | 7/1998 | Okamoto et al. |
| 5,883,959 | A | * 3/1999 | Kori .......................... 380/203 |
| 5,896,454 | A | 4/1999 | Cookson et al. |
| 6,243,530 | B1 * | 6/2001 | Kato .......................... 386/94 |
| 6,587,638 | B1 | 7/2003 | Watanabe et al. |
| 6,947,663 | B1 | 9/2005 | Koda et al. |
| 7,043,138 | B1 * | 5/2006 | Wakahara et al. ............. 386/83 |
| 7,248,784 | B1 | 7/2007 | Kori et al. |
| 2001/0017828 | A1 * | 8/2001 | Yamada ................... 369/47.12 |
| 2005/0089167 | A1 | 4/2005 | Saitoh et al. |

FOREIGN PATENT DOCUMENTS

| JP | 07-046535 A | 2/1995 |
| JP | 09-214845   | 8/1997 |
| JP | 2000-048480 A | 2/2000 |
| JP | 2000-123480 A | 4/2000 |
| JP | 2000-152196 A | 5/2000 |
| JP | 2000-278655 | 6/2000 |
| JP | 2001-103393 | 4/2001 |

* cited by examiner

*Primary Examiner*—Thai Tran
*Assistant Examiner*—Girumsew Wendmagegn
(74) *Attorney, Agent, or Firm*—Townsend and Townsend and Crew LLP (57) ABSTRACT

According to a video information outputting apparatus, a video information receiving apparatus, a video information outputting method and a video information transmitting method, for receiving and outputting digital video information. The digital information is outputted in the same quality as it is, when it is certificated that an external apparatus operates according to a copy control information, while no information limited on copying thereof is outputted when it is not. It thereby prevents the information, which is outputted from the video information outputting apparatus to an external apparatus, from being used in other purposes than the original object thereof, thereby giving disadvantages onto the producer and/or copyright owner of the information.

20 Claims, 8 Drawing Sheets

| OUTPUT TERMINAL | | COPY CONTROL INFORMATION | | | | |
|---|---|---|---|---|---|---|
| | | COPY FREE | COPY NO MORE | COPY ONE GENE | COPY NEVER | EPN NOTE 2) |
| 309 | WITH COPY PROTECTION | ENABLE | ENABLE | ENABLE | ENABLE | ENABLE |
| | WITHOUT COPY PROTECTION | ENABLE | DISABLE | DISABLE | DISABLE | DISABLE |
| 310 (RGB) NOTE 1) | | ENABLE | ENABLE | ENABLE | ENABLE | ENABLE |
| | | | WITH RESOLUTION REDUCING | | | |

NOTE 1) SOMETIMES, NO OUTPUT IS PRODUCED WHEN OUTPUTTING TO OUTPUT TERMINAL 309
NOTE 2) ENCRYPTION PLUS NON-ASSERTION

| OUTPUT TERMINAL | | COPY CONTROL INFORMATION | | | | EPN |
|---|---|---|---|---|---|---|
| | | COPY FREE | COPY NO MORE | COPY ONE GENE. | COPY NEVER | |
| 309 | WITH INFORMATION PROTECTION | OUTPUT AVAILABLE | | | | |
| | WITHOUT INFORMATION PROTECTION | OUTPUT AVAILABLE | OUTPUT PROHIBITED OR WITH RESOLUTION LIMITATION | | | |
| 310 (RGB) | | OUTPUT AVAILABLE | WITH RESOLUTION LIMITATION OR OUTPUT AVAILABLE | | | |

VIDEO INFORMATION OUTPUTTING APPARATUS, VIDEO INFORMATION RECEIVING APPARATUS, VIDEO INFORMATION OUTPUTTING METHOD AND VIDEO INFORMATION TRANSMITTING METHOD

BACKGROUND OF THE INVENTION

1. Field of the Invention

The present invention relates to a video information outputting apparatus, a video information receiving apparatus, a video information outputting method and a video information transmitting method, for receiving and outputting digital video information. In particular, the present invention relates to an apparatus and a method for imposing restriction upon recording the outputted video information on a recording medium, or upon outputting it therefrom, upon basis of, in particular, an authority of the copyright owner thereof.

2. Description of Prior Art

In the technical filed of television broadcasting, apparatuses for recoding television programs and/or for reproducing thereof, and package media, such as movie software, etc., a so-called digital video broadcasting is started, and then corresponding thereto are put on the market a receiving apparatus, a display apparatus, and a digital recording/reproducing apparatus, etc., for home-use. Package software, which can be used in those apparatuses, will appear on the market in near future. Such the digital broadcasting or the digital recording apparatus has an advantage that it does not accompany deterioration in quality in the processes of transmission or recording/reproducing of the information. However, when high quality copies of the information are produced and appear on the market in a large number thereof under the condition where the copyright owner does not know it, and if such the copies are repeated, problems occur that the profit will not return to the copyright owner.

In U.S. Pat. No. 5,896,454, for example, a method is disclosed, where a copy control information of two (2) bits is added to the information. With this, one among three categories, i.e., "Copy Never", "Copy Free" and "Copy One Generation" is selected at the will of the copyright owner or the producer of information, thereby to control the operation of the recording apparatus. Thus, the recording apparatus stops or prohibits the recording operation if it is "Copy Never", but does the recording operation if "Copy Free". In case of the "Copy One Generation", after converting the information into "No More Copies" information, then the recording apparatus conducts the recording operation thereof.

SUMMARY OF THE INVENTION

What was disclosed in the conventional art mentioned above is to restrict or limit the operation on the recording apparatus side, in the case only where the information, being once provided or given, is supplied to the recording apparatus. However, for example, when the information is received in the receiving apparatus, or when it is reproduced from the reproducing apparatus, and then when it is outputted from that apparatus to an outside, there are further matters to be considered into.

It is needless to say that the operation of outputting to an outside of such the apparatus is needed for supplying the information to the display apparatus, and in such the case, also consideration must be paid on a possibility of being used for other purposes than the displaying. When being once outputted from the apparatus, also consideration must be paid on the case of accompanying no such the copy control information, as was mentioned above, however even if the outputted information accompanies the copy control information therewith, the apparatus does not always operate responding to the copy control information, necessarily, at the receiving side thereof. For example, there may be a case of outputting the information in digital signal or a case of outputting after converting it into an analogue signal. For example, with the PC (Personal Computer) at the present, when the information is received on a tuner board and is outputted through a graphic board to the display, the output is made in the form of R, G and B signals, but it does not accompany the copy control signal.

When those outputs are used for the purpose other than displaying on the display apparatus, there is a possibility that a copy is produced, and then there occurs a problem that it gives or affects disadvantages to the copyright owner thereof. In this regard, however no reference was made by the document mentioned above.

An object, therefore according to the present invention, by taking the problems mentioned above into the consideration, is to provide a method for outputting video information to an outside and an apparatus thereof, without giving such the disadvantages to the copyright owner.

For accomplishing the object mentioned above, according to the present invention, there is provided a video information outputting apparatus, for outputting either one of digital video information inputted and digital video information reproduced from a storage medium, comprising: a control information detector for detecting a control information, including at least a copy control information therein, which is added to said digital video information; a first output portion for outputting said digital video information to an external apparatus; a second output portion for converting said digital video information into analogue video signals and outputting said analogue video signals to an external apparatus; and a controller for controlling outputs at said first output portion and said second output portion depending upon the control information, being detected in said control information detector.

Also, according to the present invention, there is provided a video information outputting apparatus for outputting either one of digital video information inputted and digital video information reproduced from a storage medium, comprising: a control information detector for detecting control information added to said digital video information; an output portion for outputting said digital video information to said external apparatus; a condition certification portion for certificating a condition of either one of said output portion and said external apparatus; and an output controller for controlling an output of said output portion, wherein said output controller controls said output depending upon the control information detected in said control information detector and the condition of either one of the external apparatus and the output portion certified in said condition certification portion.

Herein, said control information is the information relating to copy restriction of the digital video information or protection of said video information. And, when said external apparatus or said output portion cannot be certified by the condition certification portion, and if the copy restriction of the digital video information or the protection of said video information is indicated by the control information, said output controller stops or prohibits the output from said output portion. The certification on said condition of said external apparatus or said output portion in said condition certification portion includes a certification with using a key signal between the external apparatus and the output portion.

For accomplishing the object mentioned above, according to the present invention, there is provided an information receiving apparatus for receiving digital video information and outputting it to an external apparatus, comprising: a receiver for receiving said digital video information; a control information detector for detecting control information, including at least a copy control information therein, which is added to said digital video information; a first output portion for outputting said digital video information to an external apparatus; a second output portion for converting said digital video information into analogue video signals and outputting said analogue signals to an external apparatus; and a controller for controlling outputs at said first output portion and said second output portion depending upon the control information, being detected in said control information detector.

For accomplishing the object mentioned above, according to the present invention, there is provided a video information outputting method for outputting either on of digital video information inputted and digital video information reproduced from a storage medium, from a first apparatus to a second apparatus, comprising the following steps: a step for detecting control information added to said digital video information; a step for certificating a condition of either one of said first apparatus and said second apparatus; and controlling an output from said first apparatus, upon basis of said control information detected and the condition certificated of either one of said first apparatus and said second apparatus.

For accomplishing the object mentioned above, according to the present invention, there is provided a video information transmitting method for transmitting digital video information toward an information receiving apparatus, comprising the following steps: adding control information, including at least a copy control information, to said digital video information to be transmitted; and controlling an output signal when said information receiving apparatus converts said digital video information into analogue video information and outputting said analogue signal to an external apparatus.

Also, according to the present invention, there is provided a video information transmitting method for transmitting digital video information toward an information outputting apparatus for inputting information and outputting it to an external apparatus, comprising the following steps: adding control information in relation with either one of copy restriction of said digital video information and protection of video information to said digital video information to be transmitted; wherein said control information is used for controlling an output of said digital video information, being combined with a result of certification of either one of said information outputting apparatus and said external apparatus, when said digital video information is outputted from said information outputting apparatus to said external apparatus.

BRIEF DESCRIPTION OF THE SEVRAL VIEWS OF DRAWING

Those and other objects, features and advantages of the present invention will become more readily apparent from the following detailed description when taken in conjunction with the accompanying drawings wherein:

FIG. 1 is a block diagram for showing an embodiment of an entire system, in which the present invention is applied to;

FIG. 4 is a block diagram for showing the structure of an example of a decoder, in which the present invention is applied to;

FIG. 5 is also a block diagram for showing the structure of other example of a decoder, in which the present invention is applied to;

FIG. 7 is a block diagram for showing the structure of an example of a decoder and a display, in which the present invention is applied to;

FIG. 8 is a block diagram for showing the structure of an example of a PC, in which the present invention is applied to;

FIG. 9 is a block diagram for showing the structure of an example of a graphic board, in which the present invention is applied to;

FIG. 10 is also a block diagram for showing the structure of an example of a graphic board, in which the present invention is applied to;

FIG. 11 is a block diagram for showing the structure of other example of the decoder, in which the present invention is applied to.

DETAILED DESCRIPTION OF THE INVENTION

Hereinafter, embodiments according to the present invention will be fully explained by referring to the attached drawing, depending upon the necessity thereof.

The present invention relates to, in particular, an outputting method of video information, and has an object to dissolve such the disadvantages to the copyright owner as was mentioned above, by providing or imposing a certain limitation or restriction thereon. The embodiments are shown in FIGS. 4 to 10, mainly or overridingly, however before the explanation thereof, first of all, description will be made on an entire system, in which the present invention is applied to.

Figure 1:
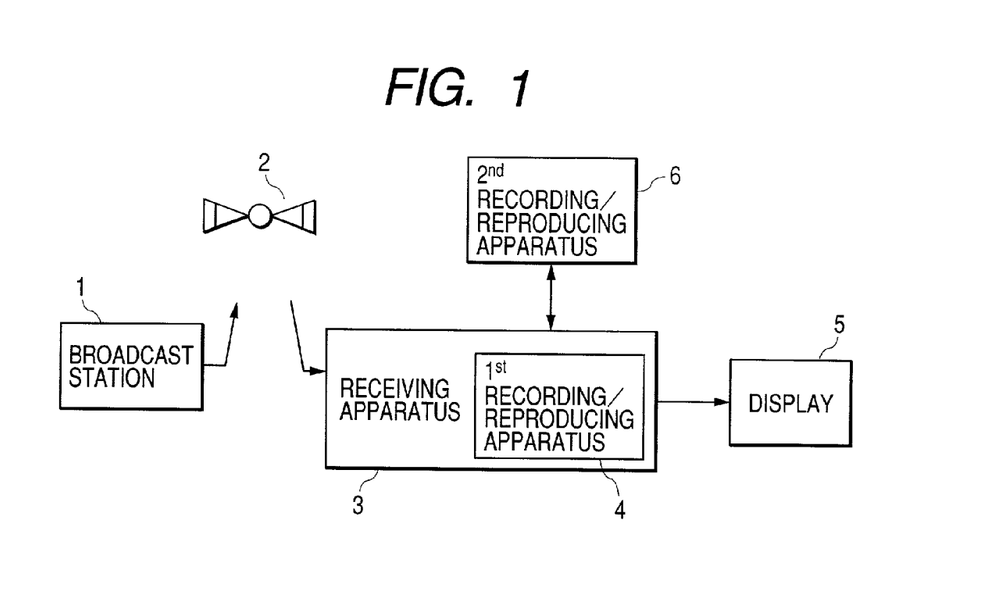

FIG. 1 is a block diagram for showing an example of an embodiment of a system, which are utilized in the present invention, in particular in a case where information is transmitted through broadcasting and is recorded and/or reproduced, for an example thereof. This system is built up with: an information providing station 1, such as, a broadcasting station; a relay station 2; a receiving apparatus; a first recording/reproducing apparatus 4; and a display apparatus 5. Further, within a second recording/reproducing apparatus 6, a first recording/reproducing portion 61 and a second recording/reproducing portion 62 are built up therein. Herein, when recording the broadcast information or the like, depending upon the copy control information added thereto, it is recorded into at least one of the first recording/reproducing apparatus 4 and the second recording/reproducing apparatus 6. Also herein, the first recording/reproducing apparatus 4 is mentioned that it is built in the receiving apparatus 3 and is according to digital recording method. As a recording medium thereof, non-removable one, such as a hard disc or the like can be applied to. Although removable one may be used therein, such as, a videodisc, videotape, etc., for example, however since the recording/reproducing apparatus built in the receiving apparatus is used, mainly for storing the information, temporarily, for a relatively short time-period, in many cases, therefore it may be such the non-removable one. The second recording/reproducing apparatus 6 is, herein, explained to be a one, which is attached on an outside of the receiving apparatus 3. Other than the hard disc, such as a magnetic tape, an optical disc, etc., may also be applicable as a recording medium of being removable. Further, the present invention can be applied to, even if at least one or both of the first recording/reproducing apparatus 4 and the second recording/reproducing apparatus 6 is/are not provided.

The information providing station 1, such as the broadcasting station, for example, sends or transmits signal waves modulated upon basis of the information, through the relay station 2, such as a satellite for use in broadcasting, etc. Other than this, transmission through a cable, a telephone network, or broadcasting by means of ground wave, etc., may be applicable thereto. The signal wave received by the receiving apparatus 3 at the receiving side, as will be mentioned later, after being demodulated into information signal, i.e., in the form of signal being suitable for recording, is recorded into the first recording/reproducing apparatus 4 and/or the second recording/reproducing apparatus 6, depending upon necessity. It is also transferred to the display apparatus 5. Herein, a user can listen to and/or look at the contents of information, directly. Also, the information reproduced by the first recording/reproducing apparatus 4 and/or the second recording/reproducing apparatus 6 is given to the display apparatus 5 through the receiving apparatus 3, wherein the information of original pictures and/or voices can be enjoyed through audiovisual sense.

The video information to be transmitted includes various ones, and in the case of the television broadcasting, for example, two kinds are available, the one is the HD (High Definition) broadcasting of using scanning lines exceeding over 1,000, in case of much, and the other the SD (Standard Definition) broadcast using scanning lines of about 500 pieces. Accordingly, at the receiving side, it is necessary to make a measure or steps for plural numbers of the available broadcasting methods, if necessary. Also, the control information, being indicative of which broadcasting method is applied to, may be added to the information, in the similar manner as the copy control information mentioned above, thereby to be transmitted with the information.

The receiving apparatus 3, not intending to include only a STB (Set Top Box) therein, for example, being specialized for broadcast receiving, but may also includes a PC having a tuner board and/or a graphic board therein. In that case, the first recording/reproducing apparatus 4 corresponds to the hard disc drive and the peripheral portions thereof. Also, as will be mentioned later, the receiving apparatus 3 itself may includes a display built therein, corresponding to the display apparatus 5.

In a case where the removable recording medium is provided or supplied, on which the information was recorded in advance, such as, in the case of the package software, for example, the operation after the reproduction will be conducted in the second recording/reproducing apparatus 6, into which the medium is loaded. In this case, it is same to the condition of excluding the information providing station 1 and the relay station 2 from the entire system, however it is still possible to be applied with the present invention.

The transmission of the video information between the apparatuses are achieved in the form of digital signals, in many cases, however for example, in the case between the receiving apparatus 3 and the display apparatus 5, they may be sometimes connected with by means of analogue signals. They are connected with, by means of a signal of brightness (i.e., Y signal) and two (2) kinds of color difference signals (i.e., Cb, Cr), in a case, or a so-called RGB signal, in particular in the case of the PC.

Figure 2:
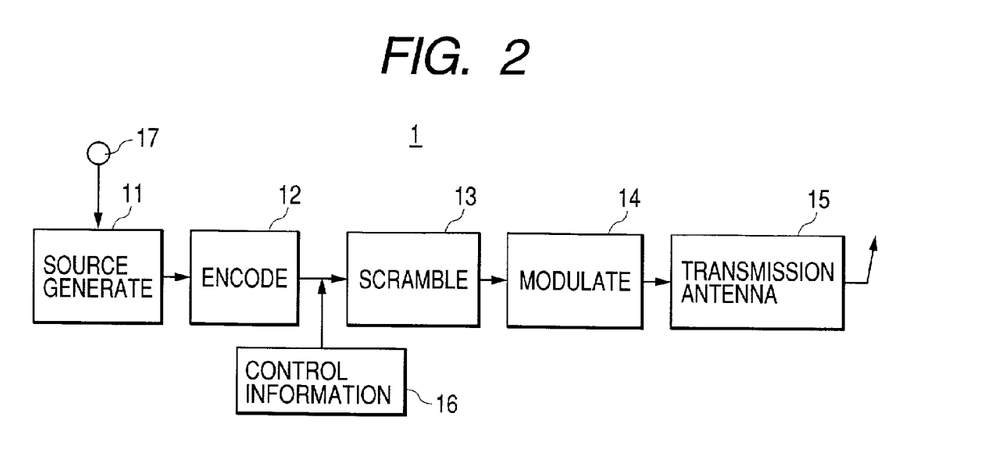
FIG. 2 is a block diagram for showing the structure of an example of an information providing station 1, such as a broadcasting station, in the FIG. 1.

FIG. 2 is a block diagram for showing the structure of the information providing station 1, such as the broadcasting station, for example. It is buildup with: a source generator 11; an encoding circuit 12 for conducting compression on data, through, such as, the MPEG method, etc.; a scrambling circuit 13; a modulating circuit 14; an antenna 15 for sending or transmitting; a control information adding circuit 16; and an input terminal 17.

Information, such as audiovisual information generated in the source generator 11, which is built up with a camera and/or a recording/reproducing apparatus, etc., is processed to be compressed in data amount thereof, in the encoder 12, so as to be transmitted with using the narrower band region to be occupied. Depending upon the necessity, the information is encrypted to be transfer, in the scrambling circuit 13, so that only a specific viewer(s) can see and/or heart it. After being modulated to be suitable for transmission in the modulating circuit 14, the signal is emitted or irradiated in the form of radio wave from the sending antenna 15, toward the relay station 2, such as the satellite for use in broadcasting, etc., for example. In this instance, in the control information adding circuit 16, the information, such as the copy control information and the information indicative of the broadcasting method, etc., is added to. Further, for the purpose of protection of the information, it is also possible to send or add other control information, such as, EPN (Encryption Plus Non-assertion) indicative of whether quality restriction should be imposed or not when the information is outputted. Also, though being omitted in the previous FIG. 1, from the input terminal 17 is inputted a request information, for example, through the telephone network, etc. This may be used practically in a system, such as, the video demand system or the like, wherein information to be sent is determined responding to the request from a viewer.

Further in actual, plural numbers of information are multiplexed on one radio wave, through the method of time-sharing, spectral diffusion, etc., in many cases. Not mentioned in FIG. 2 for the purpose of simplification of explanation, but in this case, the system including the source generator 11 and the encoding circuit 12 are also provided in plural numbers thereof, and a multiplex is provided between the encoding circuit 12 and the scrambling circuit 13, for multiplexing the plural numbers of the information therein.

Figure 3:
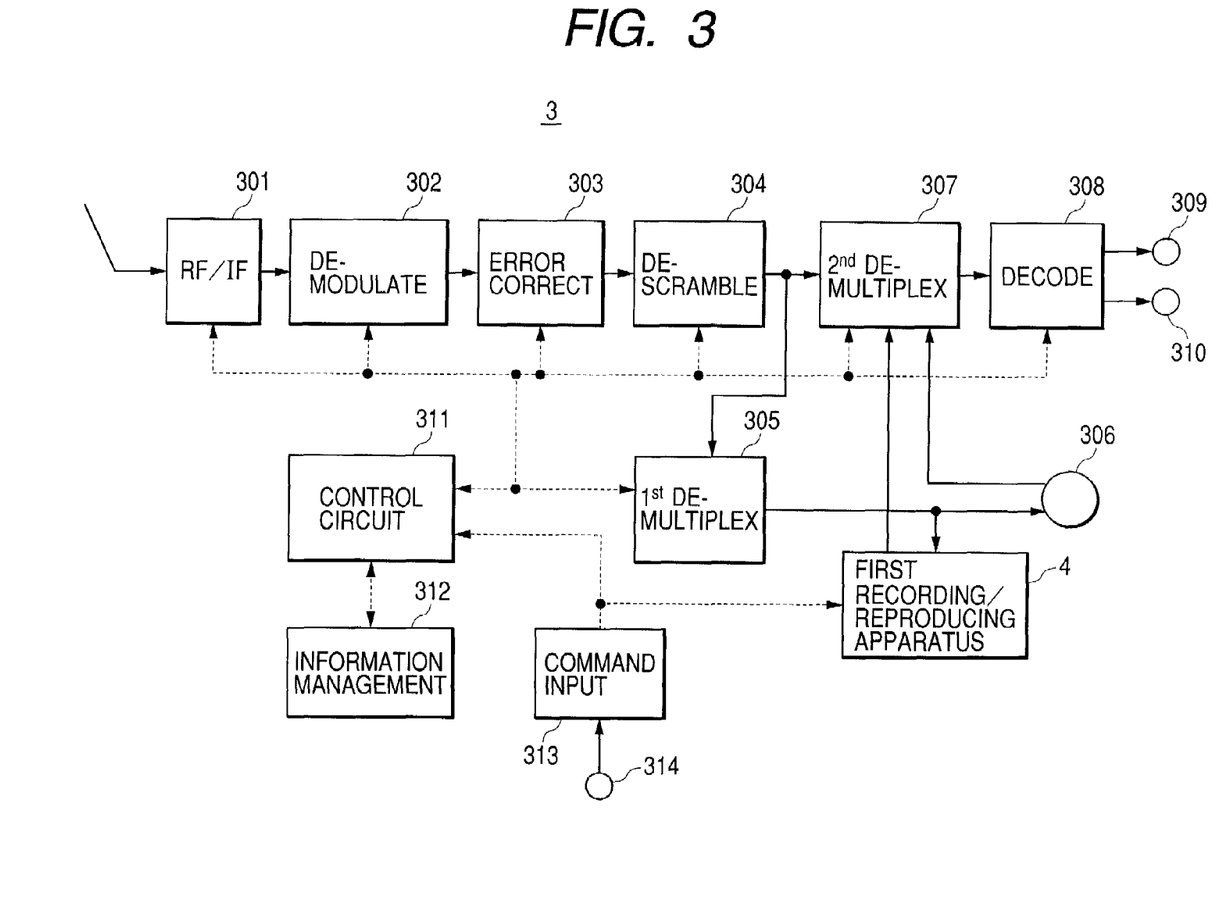
FIG. 3 is a block diagram for showing the structure of an example of a receiving apparatus in the FIG. 1.

FIG. 3 is a block diagram for showing the structure of the receiver 3 in the system shown in the FIG. 1. This comprises: a RF/IF conversion circuit 301; a demodulation circuit 302; an error correction circuit 303; a de-scramble circuit 304 for de-scrambling the encryption which is imposed on or added into the signal to be transmitted; a first de-multiplex circuit 305; an input/output terminal 306; a second de-multiplex circuit 307; a decoder circuit 308; output terminals 309 and 310; a control circuit 311 for controlling an entire of the receiving apparatus 3; an information management circuit 312; a command input circuit 313; and an input terminal 314. Herein, the first recording/reproducing apparatus 4 is assumed that it is built in the receiver apparatus 3, as was shown in the FIG. 1. In the figure, the solid lines indicate the flows of main information, such as the audiovisual information, etc., and dotted lines the flows of control signals between the respective constituent elements thereof.

Herein at first, explanation will be given on the flows of the information, such as the audiovisual one indicated by the solid lines, in relation with the constituent elements 301-310. Into the RF/IF conversion circuit 301 are inputted the radio waves from the relay station, such as the satellite for use in broadcasting, for example. Herein, the radio waves on RF band are converted into IF (Intermediate Frequency) in frequency thereof, being the signal of a constant bandwidth independent from the receiving channel, and in the demodulation circuit 302, they are demodulated from the modulation operation processed for the purpose of transmission thereof. Further, after errors occurring on the way of transmission are detected and are further corrected in the error correction circuit 303, the decryption is carried out on the transmitted code or cipher in the de-scramble circuit 304. Thereafter, they are transferred to the first and second de-multiplex circuits 305 and 307. As was mentioned in the above, in particular, in the case of the digital broadcasting, plural numbers of information are multiplexed on one (1) channel, through the method of time-sharing, spectrum diffusion, etc., in many cases. The de-multiplexers are provided for dividing only desired information from them. The reason of provision of two (2) de-multiplexers is, not only for the purpose for enabling a so-called recording a program on a different channel (i.e., recording the program on the channel different from the that which is selected or displayed on the screen at present), but also for removing the information of no-value to be recorded in the first de-multiplex circuit 305. Namely, within the information may be contained additional information, such as, a weather forecast, a broadcasting schedule of the programs, etc., in many cases, however they are only valuable to be viewed at the present time when being on air, but have no value to be recorded, so as to be viewed some other days, therefore they are erasable herein.

An output of the first de-multiplex circuit 305 is provided to the first recording/reproducing apparatus 4. It is also provided to the input/output terminal 306, wherein the transmission of signals is conducted between the second recording/reproducing apparatus 6. The input/output terminal 306 is a bi-directional terminal, and it sends and/or receives the information to be recorded and/or reproduced, such as digital data, etc. In general, a connector according to the IEEE 1394 regulation may be adopted, in many cases.

In the first recording/reproducing apparatus 4 and the second recording/reproducing apparatus 6, when an operation command or instruction is made on recording of information, but no recording is made if the copy control information added to the given information indicates "Copy Never" or "NO More Copies". If it indicates "Copy One Generation", then recording is conducted after converting it into "No More Copes". If it indicates "copy Free", the information is recorded as it is. Other than those, there are further cases where operations will be allowed: an operation of recording the information of "Copy Never", temporarily, but with restriction on a time-period for use of reproduction thereof; an operation of recording and moving the information of "No More Copies" under the condition that the original source of the information will be made unreadable or non-reproducible.

To the second de-multiplex circuit 307 mentioned previously is connected the information transmitted from the de-scramble circuit 304, the information reproduced by the first recording/reproducing apparatus 4, or the information from the input/output terminal 306, which is reproduced by the second recording/reproducing apparatus, and among them, any one is selected to be viewed, and further only desired information is divided therefrom. In the next decoder circuit 308, the compression is decoded or decompressed from the moving video data, which is put on the information before the transmission thereof, and after treating those processes, which will be explained by referring to FIGS. 4 and 5 later, the data is transmitted to an external apparatus(es) through the output terminals 309, 310. Also will be mentioned later, the output terminal is enough to be provided by only one (1), in any case, however in this case, there is shown the case of two (2) in the number thereof. The information signals at the output terminal 309 and 310 may be any one of the digital and the analogue, however herein, it is presumed that the former is the digital output while the latter the analogue output.

Next, description will be made on the control signals shown by the dotted lines. The control circuit 311, conducting transmission of the control signals between the respective constituent elements 310 to 305, 307 and 308 mentioned above, and controls so that the receiving apparatus 3 performs the desired operation, as a whole. The information management circuit 312 supplies or provides management data responding to the requirement thereof, when the control circuit 311 is performing the control. For example, information of a receiving contract is stored therein. When the user designates or selects the channel, on which she/he wishes to view, this designation is inputted from the input terminal 314, and is transmitted to the control ciruict 311 through the command input portion 313. The control circuit 311 requires the receiving contract information to the information management circuit 312. When deciding that the contract was made on the channel which the user designates, the control circuit 311 sends it to the respective constituent elements mentioned above, thereby conducting the control operations, such as, an instruction or command for the receiving operation on that channel selected.

Also, when the first recording/reproducing apparatus 4 is built in the receiving apparatus 3, the recording/reproducing operation is/are conducted responding to the command of the user inputted from the input terminal 314. For this, the output of the command input portion 313 is supplied to. This control signal may be supplied from the control circuit 311 in the place thereof.

Figure 4:
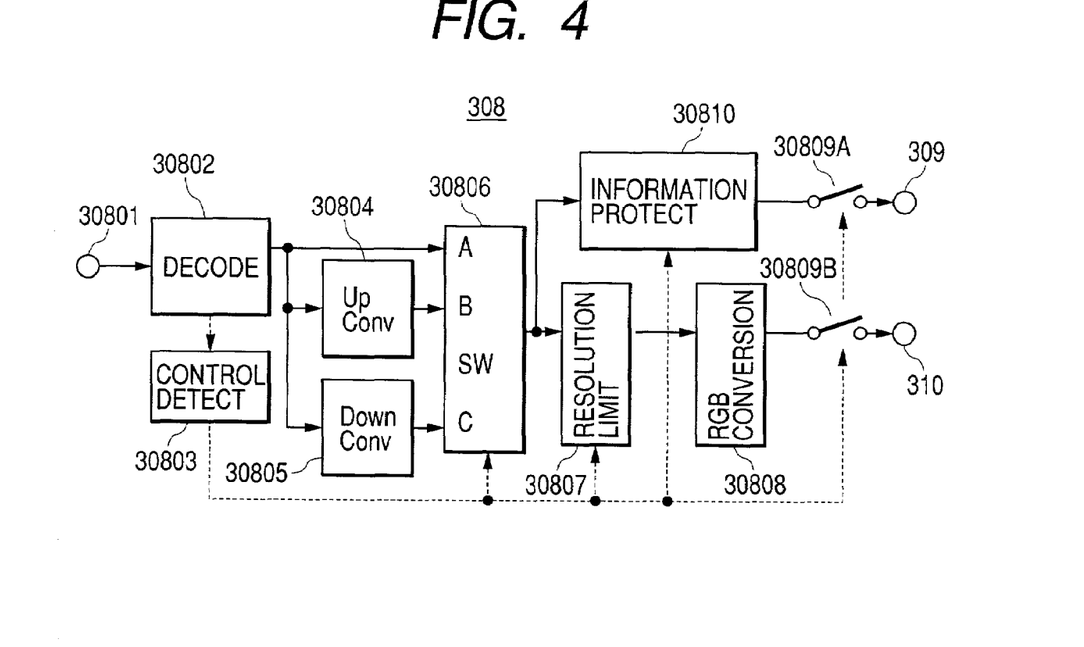
Figure 5:
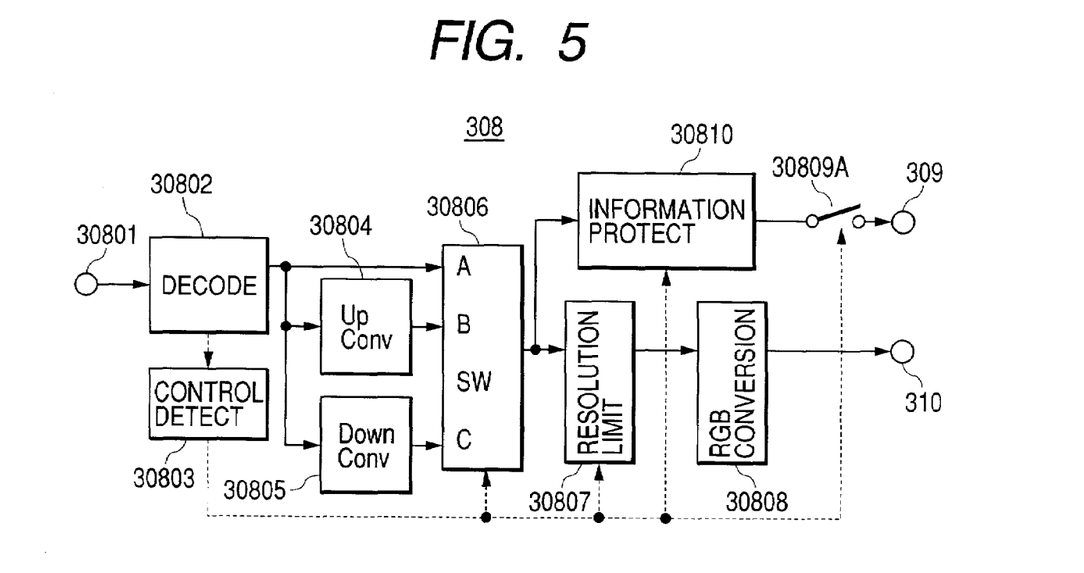

Next, an outputting method of the video information, as a core or gist of the present invention, will be mentioned by referring to FIGS. 4 and 5. Those are block diagrams for showing the embodiment according to the present invention, wherein the internal structure of the decoder circuit 308 shown in the FIG. 3. This comprises: an input terminal 30801; a decoder circuit 30802; a control detector circuit 30802; an up-converter circuit 30804; a down-converter circuit 30805; a switch 30806; a resolution limiter circuit 30807; a RGB converter circuit 30808; switches 30809A and 30809B; and an information protector circuit 30810. The output terminals 309 and 310 are those, which were shown in the FIG. 3. Herein, the output terminal 310 is presumed for the RGB signal, however it may not be restricted thereto. Also, the RGB conversion circuit 30808 may be sifted to just after the switch 30806, so as to make the output terminal 309 for the RGB signal.

To the input terminal in FIG. 4 is provided an output from the second de-multiplex circuit 307 shown in the FIG. 3. This signal is decoded or decompressed from the compression put on the moving video data before transmission thereof, in the decoder circuit 30802, thereby being expanded. The output thereof is provided to one end terminal of the switch 30806 (hereinafter, being called by "A terminal"), the up-converter circuit 30804, and the down-converter circuit 30805. An output of the up-converter circuit 30804 is provided to a "B terminal" of the switch 30806, while an output of the up-converter circuit 30805 to a "C terminal" of the switch 30806.

On a while, an output of the previous decoder circuit 30802 is also provided to a control detector circuit 30803, wherein various control information are detected, including, such as the above-mentioned copy control signal, the control information indicative of broadcasting method, etc., and upon the result thereof, connections of the switch 30806, etc., are determined. Herein, the control detector circuit 30803 has it's own decoder portion in the figure, for making the drawing being completed therein, however the detection function may be owned or achieved by the control circuit 311 shown in the FIG. 3, thereby to provide the control signal therefrom. The connections of the switch 30806 will be mentioned later.

An output of the switch 30806 is provided to the output terminal 309 through the information protector circuit 3080 and the switch 30809A, only when this connected, thereby to be outputted to an external apparatus. This is also provided to the resolution limiter circuit 30807, thereby imposing a limitation or restriction on the horizontal resolution power if necessary, depending upon the control signal. In many cases, up to this stage, the video information is transmitted in the form of the brightness (Y) and the two (2) color difference signals (Cb, Cr), however they are further converted into the RGB signal in the RGB converter circuit 30808, to be provided to the output terminal 310 through the switch 30809B, but only when this is connected, thereby being outputted to the external apparatus. Further, from the output terminal 310 is outputted the video information in the form of the analogue signal, therefore though not shown in the figure, a DAC (Digital Analogue Converter) should be disposed in any portion in an upstream thereof. However, the limitation or restriction imposed on the resolution power (i.e., reduce resolution) may be made not only upon the horizontal resolution, but also upon the vertical resolution, too. Also, the limit upon the resolution power may be made in the decoder circuit 30802, when being decoded therein.

Explanation will be given on a method for switching over the operation of the switches 30806, 30809A and 30809B, the resolution limiter circuit 30807, and the information protector circuit 30810, upon basis of the control signals.

With one embodiment according to the present invention, for protecting the copyright owner from such the disadvantage of using the video information diversely in other object than the inherent one, to be displayed on a display apparatus, in particular when the video information is outputted from the apparatus to an outside, it is characterized that the quality of the video information to be outputted, the number of pixels thereof, and also the resolution power thereof, etc., are changed depending upon the control information added thereto. The information, in particular, of the HD method is large in both the scanning lines and the horizontal pixel numbers thereof; therefore it is able to reproduce pictures of high quality. However, if this is used in other way different from the original object thereof, the copy products or others fulfilling a certain quality appear on the markets, and this results in a cause of affecting disadvantages to the copyright owner of the video information. On the contrary to this, if the video information is equal to the conventional SD method or lower than that in the quality thereof, such the problem hardly occurs. As one of criteria of such, no problem occurs if the data contains less than 520,000 pixels per a frame, and for example, being 480 in the number of effective scanning lines and being from 720 to 960 in the horizontal pixel number. Accordingly, it is preferable to impose the limitation or restriction on the output to be supplied from the apparatus to the outside, for protection of the information, depending on the necessity thereof.

According to the present invention, consideration is made on the situation of the destination of an output to be connected to the output terminal 309. If the apparatus at the output destination of the information is able to operates depending upon the copy control information mentioned above, under the condition that the copy control information is added therewith, there is no necessity to impose such the limitation or restriction as was mentioned above, on the video information to be outputted. A way of knowing which kind of the apparatus at the output destination is, though herein not mentioned in details thereof, however a means called by the apparatus certificate is used herein. This is the way of knowing the kind of apparatus on a partner by exchanging key information between both of the apparatuses. Though not shown flows of the signals, depending upon the result of certification, the control information is output from the control circuit 311 or the control detector circuit 30803, and thereby controlling the switch 30806, etc. When the certification is established and the output destination is such the apparatus as was mentioned in the above, the switch 30806 is connected to the A terminal, while the switch 30809A is closed, and then the output of the decoder circuit 30802 is provided to the output terminal 309 through the information protector circuit 30810. However, if the information is the SD information, there occurs a possibility that a request be made to change to the HD information on a glance. In this case, it is preferable to connect the switch 30806 to the B terminal, thereby outputting the information passing through the up-converter circuit 30804.

Further, the information protection in the information protector circuit 30810 may be made always irrespective of the copy control information. In this instance, when equipment at the output destination can be ascertained to be the apparatus corresponding to through the certification, the output is provided with protection thereon always, but it is outputted without the protection if not. Also, for outputting to be displayed, since it is enough to be made the protection but not necessary to control the copy thereof, no such the copy control information may be added thereto.

Also, in the information protector circuit 30810, an operation will be conducted for achieving the information protection on the output, depending upon the necessity thereof. For example, scramble is made on the information, with using an inherent or unique number of the apparatus, which utilizes the information, an identification number of a user, etc. With doing in this manner, the possibility of using the information for other purpose than the object can be reduced much more. Preferably, no scramble is made if the copy control information detected is "Copy Fee", but in other cases than that, scramble is made for enhancement of the protection, thereby changing over the operation depending upon the control signals from the control detector circuit 30803.

Next, description will be made on a case when the equipment at the destination is such the apparatus, that will not operate depending upon the copy control information, in spite of the information provided under condition of being added with the copy control information therewith, or on a case where the information is outputted under condition of no addition of such the copy control information therewith. In this case, when the copy control information detected is "Copy Free", the information is outputted by turning the switch 30809A closed, however in cases other than that, no information is provided at the output terminal 309 by turning it opened. Since "Copy Free" means that the producer of the information will not assert her/his right strongly, from beginning, no problem will occurs if the information is outputted, but problems will occur on the right in other cases than that, therefore no output is made in the form that the copy control information will not function. This brings about an effect there is the no chance that the information outputted from the apparatus be used for other purposes than the original object thereof. In this case, on the other hand, the information imposed with a certain limitation or restriction in quality is outputted at the output terminal 310. Namely, if the copy control information contains "Copy Never", "Copy One Generation" or "No More Copies", the switch 308 is turned onto the C terminal, while the switch 30809B is turned closed. Thus, after being reduced in the scanning lines in the down-converter circuit 30805, and further being reduced in the horizontal pixel number in the resolution limiter circuit 30807, the information is provided at the output terminal 310, which contains the pixels less than 520,000 pieces per a frame. This output is not the high-qualified information, such as the HD information; therefore it brings about an effect of affecting no disadvantage even if being outputted to an outside and used in other purposes other than the object thereof.

In future, separating from the copy control information mentioned above, there can be considered that other control information will be transmitted, for indicating whether the quality control or limit should be imposed for protection of the information, as was mentioned above (being called by EPN (Encryption Plus Non-assertion), when an output is provided from the apparatus to an outside. Also in the case where this indicates or commands the quality limitation on the information, it is preferable to treat or process the information in the same or similar manner to the information but other than "Copy Free", including the operations in the information protector circuit 30810.

However, in the explanation given in the above, if the copy control information is "Copy Free", the output is provided only at the output terminal 309, but only at output terminal 310 if it is "Copy Never" or "Copy One Generation" or "No More Copies". This is only, however, for showing as an example, with certificating the fact that at present the graphic board has only one output. Accordingly, it is also possible to provide only one (1) output terminal and to replace the switches 30809A and 30809B by one (1) set of a switch of two(2)-point selection type.

Also, provision of such the switch on the route, through which the information signal is transmitted, sometimes, brings about an undesirable result, in relation with the loss. In such the case, a method is used, in which not exchanging the routes provided in plural numbers, but the operation of the circuit is reset by itself through unplugging the hot plug once. With using this, the information being outputted until at that time is stopped, and after elapsing a predetermined time period, the output on the other side is started, in the operation.

On the contrary to this, in FIG. 5, the output information is always provided at the output terminal 310, and only at the side of the output terminal 309, the output is changed in the presence by the operation of the switch 30809A. Operations of other constituent elements are same to those as shown in the FIG. 4. If the copy control information is "Copy Free", the information with no quality limitation is also provided at the output terminal, too. In this case, the output terminals 309 and 310 may be separated, or may be received in one (1) connector.

With providing only at the output terminal 309 if the copy control information is "Copy Free" while only at the output terminal 310 if other than that, in particular, in case of applying into the display apparatus having a digital input terminal and an analogue input terminal thereon, it is possible to display the high definition digital signal when it is "Copy Free", but still the analogue signal in the other case, by connecting the outputs of the output terminals 309 and 310 to the digital input and the analogue input, respectively.

Figure 6:
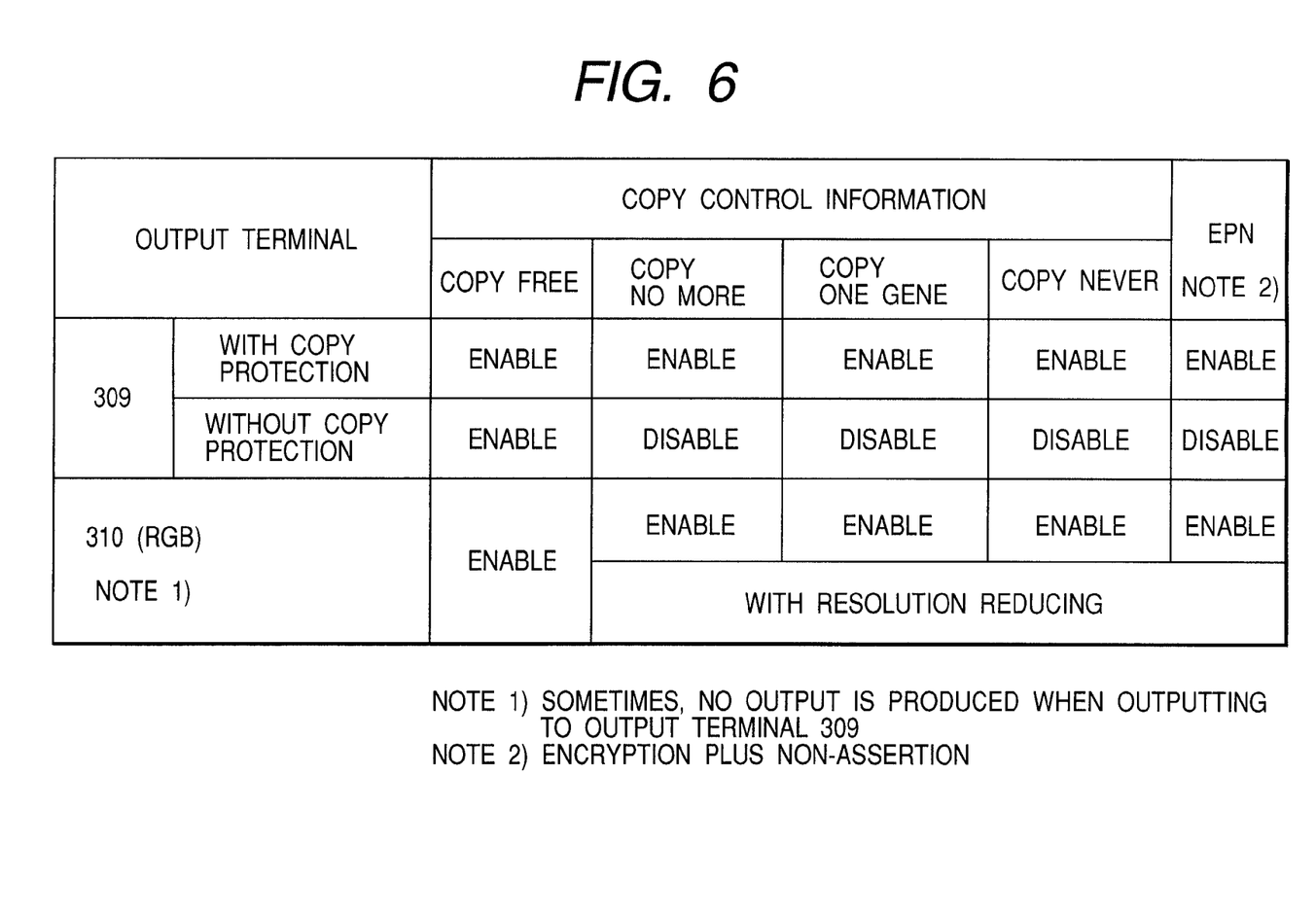
FIG. 6 is a view for explaining output information according to the present invention.
Figure 7:
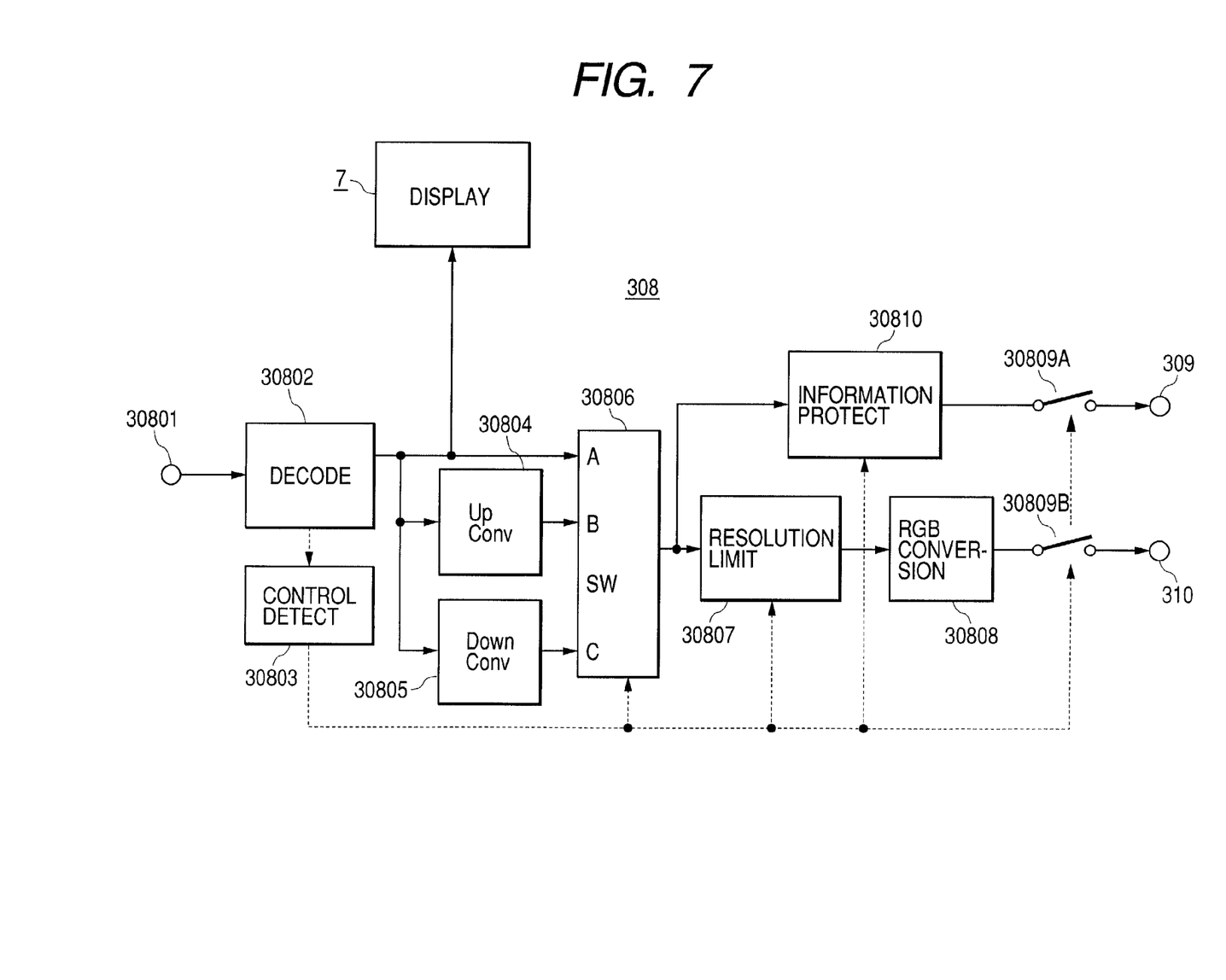

FIG. 6 shows the operations mentioned above, in brief. In a case where the copy control information functions in the apparatus at the output destination on the side of the output 309, including also the case where there is the control information indicative of the EPN mentioned above, the information is outputted without quality limitation or control thereon. In the case where the copy control information has no function, the information is outputted without impose of the quality limitation thereon (i.e., reduce resolution) if it is "Copy Fee", but it is not outputted in cases other than that. On the other hand, on the side of the output terminal 310 as the RGB output, the information is outputted without the quality limitation thereon if it is "Copy Free", but in cases other than that, the quality is limited or testricted; thus, being limited on the scanning lines, the horizontal resolution, etc., thereby being outputted with limited to or less than 520,000 pieces in the pixel number.

Further, as was explained previously in the FIG. 4, in the case where the output is provided at the side of terminal 309, sometimes no output is provided at the side of terminal 310. As an example of this, the case corresponds to where the output terminal is provided by only one system.

Next, description will be made on a case where the receiving apparatus 3 in the FIG. 2 has a display portion corresponding to the function of the display apparatus 5. An example of the decoder circuit 308 in this case will be shown in the block diagram of FIG. 7. Herein, the display portion 7 is built in the receiving apparatus 3. Thus, an output of the decoder circuit 30802 is provided to the display portion 7. Depending upon the necessity thereof, this may be exchanged by an output of the up-converter circuit 30804. This connection is conducted inside the receiving apparatus 3; therefore there is no need to impose such the quality limitation thereon. On the other hand, outputs from the output terminals 309 and 310 become ones, being called by monitor outputs, but since they are supplied to an outside of the apparatus, such the quality limitation is imposed thereon. In this instance, though the receiving apparatus 3 can be called a receiver/display apparatus having recording or storage function therein, of course, it can be applied into the case where there is no first recording/reproducing apparatus and it has no build-in recording function therein.

Figure 11:
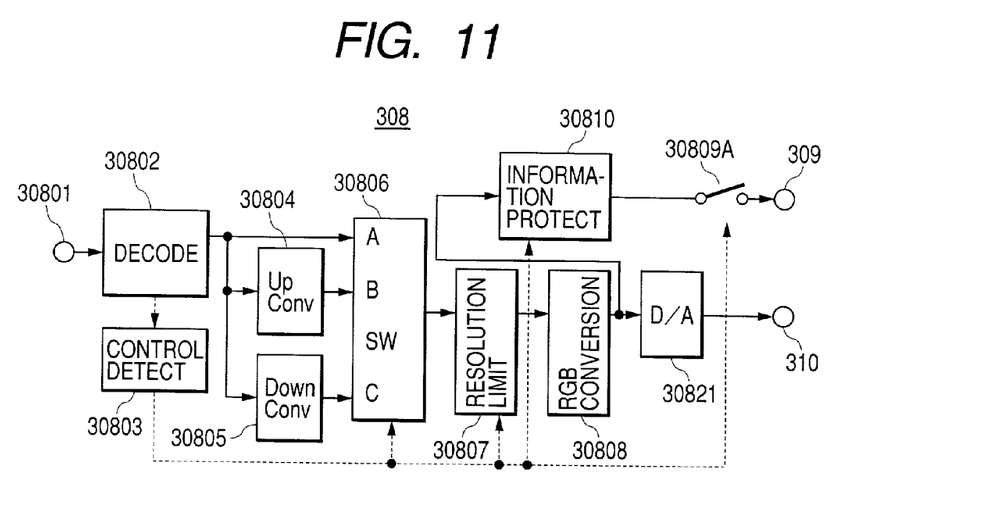

FIG. 11 is a block diagram of showing an embodiment when the digital RGB signal is outputted at the output 309. At the output 309 is provided the digital RGB signal produced in the RGB converter circuit 30808 as it is, or being imposed with the information protection thereon in the information protector circuit 30810. At the terminal 310 is outputted the analogue RGB signal, after converting the digital RGB signal produced by the RGB converter circuit 30808 into the analogue in an A/D converter 30821.

Figure 12:
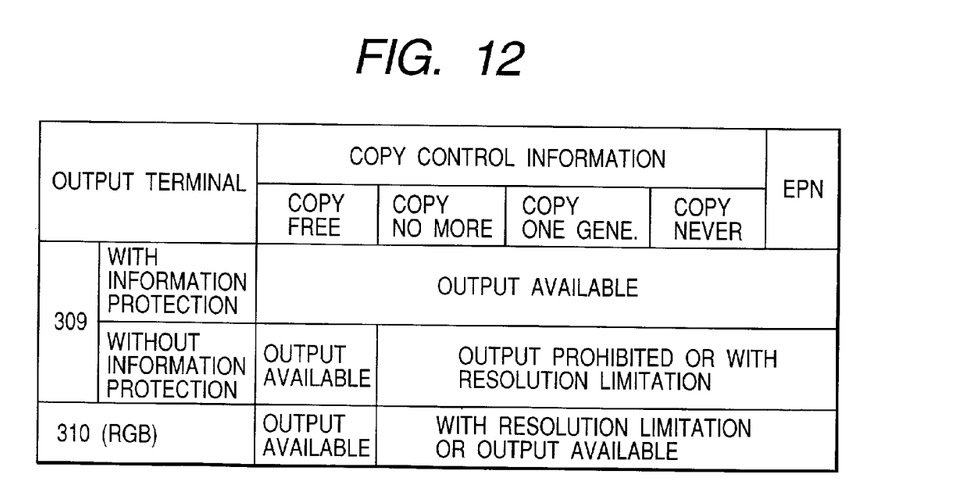
FIG. 12 is a view for explaining output information according to the present invention.

FIG. 12 shows the output operations at the terminals 309 and 310. If the output protection function is available in the apparatus at the output designation, and also including the case where there is applied the control information indicative of the EPN mentioned above, the information is outputted without being imposed with the quality limitation thereon. If no such the output protection function is available, the information is outputted when it is "Copy Free", but the output is inhibited, or is outputted but with being imposed with the resolution limitation thereon (i.e., reduce resolution) in other cases than that. In the case where such the output protection function is not available, the protection can be achieved more perfectly by inhibiting the output, however with the output by imposing the resolution limitation thereon, the output can be connected to the conventional equipments having no such the protection function therein. On the other hand, at the side of output terminal 310, the information is outputted without the resolution limitation thereon in the case of "Copy Free", but it is outputted with the resolution limitation thereon, or as it is, in other cases than that. Or, in the other cases, it may be also possible to inhibit the output thereof. In this case, the information cannot be connected to the conventional equipments being able to connect only with the analogue, but the protection can be obtained more completely or perfectly.

Figure 8:
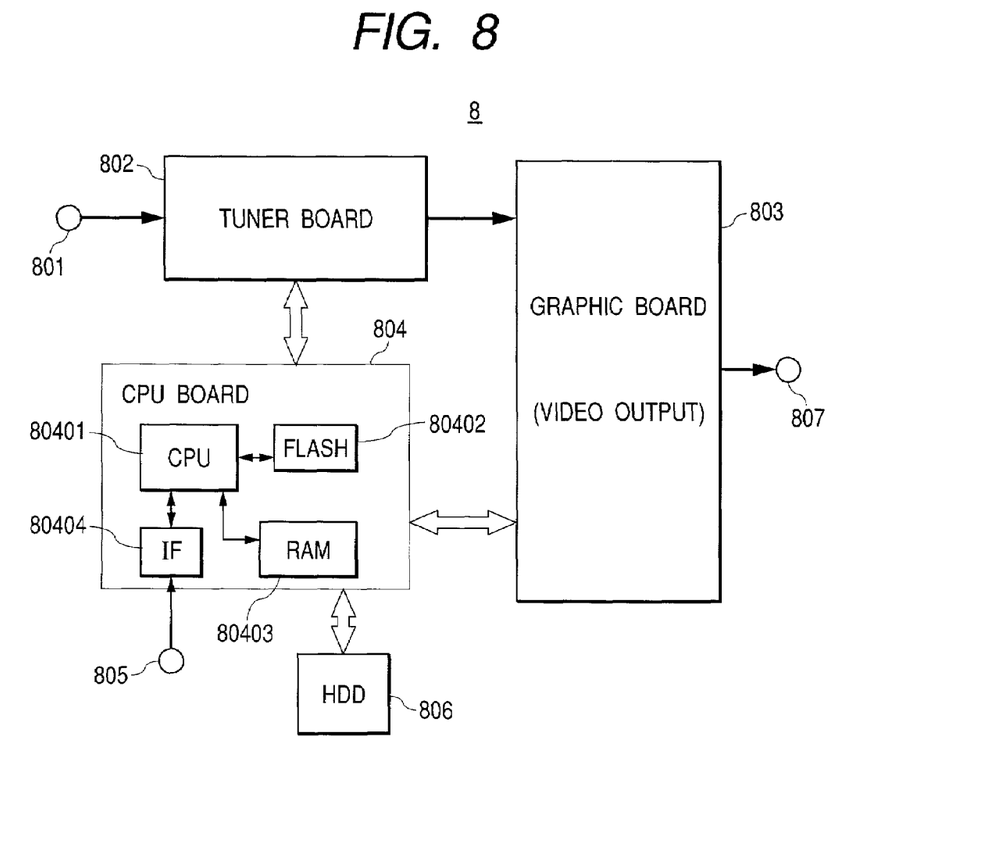

FIG. 8 is a block diagram for showing further other embodiment according to the present invention. In the previous FIG. 1, the receiving apparatus 3 is mentioned that it may be a PC having the tuner board and/or the graphic board therein. In this FIG. 8, it comprises: a PC 8; an input terminal 801; a tuner board 802; a graphic board 803; a CPU board 804; a CPU (micro-computer) 80401; a flash memory 80402; a RAM (Random Access Memory) 80403; an interface circuit 80404; an input terminal 80405; a hard disc drive 80406; and an output terminal 80407.

The first recording/reproducing apparatus 4 shown in the FIGS. 1 and 3 corresponds to the hard disc drive 80406 and it's peripheral potion thereof. Also, the constituent elements 301 to 307 are on the tuner board 802, and the constituent elements 308 to 310 on the graphic board 803. Among them, both or one of the output terminals 309 and 310 correspond(s) to the output terminal 807. The control circuit 311 corresponds to the CPU 80401, and the information management circuit 312 to the flash memory 80402 being readable and writable. The CPU 80401 also includes the RAM 80403 as the external attachment memory thereof, other than that. The command input circuit 313 and the input terminal 314 correspond to the interface circuit 80404, such as, the mouse and the key board, etc., and the input terminal 805 thereof. Accordingly, the present invention can be applied into the graphic board of the PC. This example will be explained by referring to the block diagrams shown in FIGS. 9 and 10.

Figure 9:
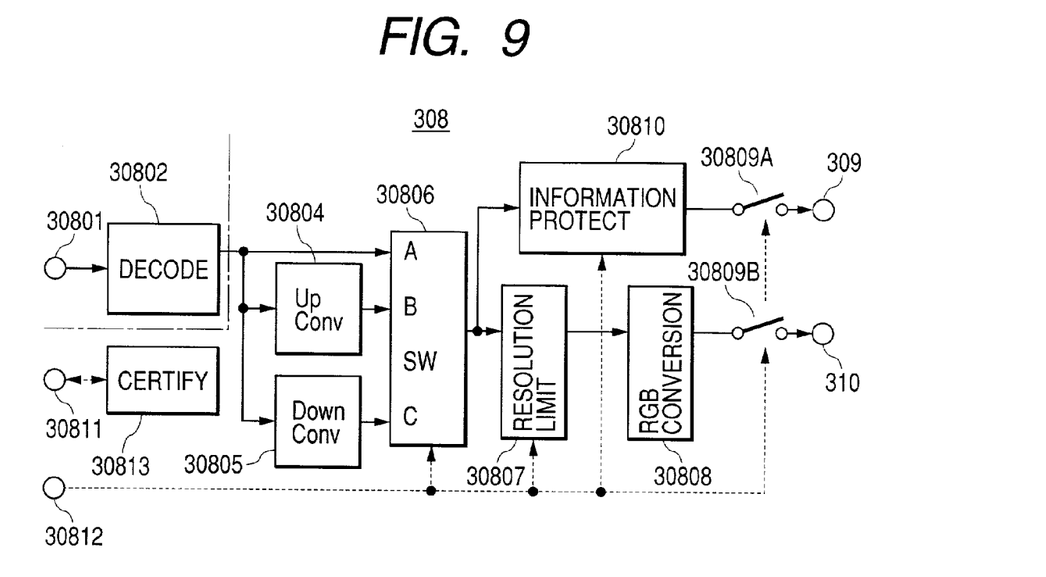

FIG. 9 corresponds to the previous FIG. 4, wherein an input/output terminal 30811 and a certification circuit 30813 are added, and an aspect differing from it lies in that the detection result from the control circuit 311 is provided at the input terminal 30812, under assumption that the function of the previous control detector circuit 30803 is replaced by the control circuit 311 in the FIG. 3. Furthermore, the control from the input terminal 30812 should not be always limited to the hardware-like, such as the control signal, but a software control may be applied in the place thereof. Each of the constituent elements shown in FIG. 9, as was mentioned above, is on the graphic board 803. By changing the cut ends, in case where the decoder circuit 30802 is put on the tuner board 802, in the same manner as the constituent elements from 301 to 307 shown in the FIG. 8, the broken lines shown in the figure come to be the cut ends of the both boards.

Figure 10:
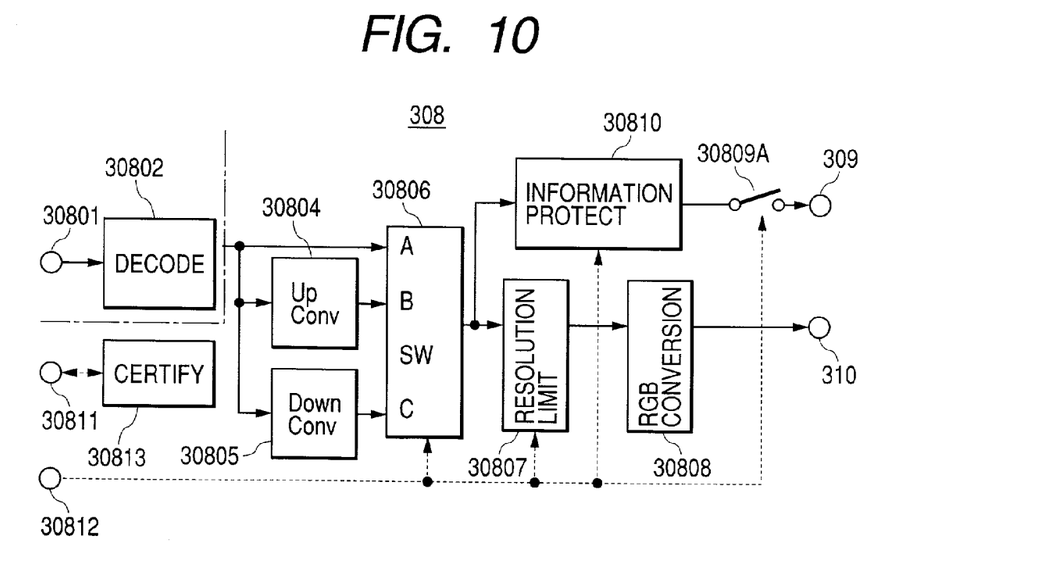

FIG. 10 corresponds to the previous FIG. 5, but other aspects thereof are same to those shown in the FIG. 9.

Explanation will be made on those operations by referring to the FIG. 9. Before the information is outputted at the output terminal 309 or 310, first the control circuit 311 of the FIG. 3 transmits the certify key for making certification on the board to the certification circuit 30813 through the input/output terminal 30811. The certification circuit 30813 turns back the certify key to the control circuit 311 if the certify key is coincident with a predetermined one. The key to be returned must not be always the same to the received one, however of course, what should be turned back is determined in advance. If the key received in the control circuit 311 is that which is predetermined in advance, that graphic board can be certified to be the board, which can perform the operations expected. If the key is different from, or no return is sent back, the certification cannot be established. The operations expected include, such as, the quality limitation or control on the information to be outputted, etc., as was mentioned by referring to the FIGS. 4, 5 and 6 previously.

When the certification is established, the control circuit 311 keeps giving a request to the certification circuit 30813 to inform a kind of the information to be outputted, continuously, and receives it. The kind of the information is indicative of: whether the digital output added with the control information should be provide or not; whether the digital output added without this should be provide or not; or an analogue output, in particular, the RGB signal should be provided or not. Also, depending upon the necessity, in the information protector circuit 30810, it is certified whether the protection is imposed on the information or not. Depending on this, the control circuit 311 controls the operations, as follows. In the case where the control information, such as, the copy control information or the like is added with, the digital output is provided as it is, if the information is "Copy Fee", but if being other than that, the information is encrypted for protection, thereby to be outputted. In the case where no such the control information is added with, no digital output is provided, but except for the information of "Copy Free". In case of an analogue output, the information of "Copy Free" is outputted as it is, but the information other than that is outputted while being limited in the quality, for example, to be equal or less than about 520,000 in the pixel number. Further, in FIG. 9, in the similar manner as in the FIG. 4, in any case, only one output is produced depending on the board, however the "Copy Free" information may be outputted as it is, in digital, but the information other than that may be outputted with the quality limitation thereon in analogue.

If no certification can be established, no information other than "Copy Free" is outputted, even if it is digital or analogue.

With doing in this manner, the chance where the information outputted from the graphic board can be used for other purposes than the original object thereof can be lowered. Also, though the PC is so designed that the board can be exchanged by a used, arbitrarily, but there is no anxiety that those outputting methods will not be observed.

Further, as other method, description will be made on the case where the certification circuit 30813 has no such the certify function, but only a function of informing of the kind of the information to be outputted. In this case, the control circuit 311 controls the operations as follows.

First, when being able to know the kind of the information, and in the case where the control information, such as the copy information is added with, the digital output provides the information as it is, if being "Copy Free", while provides the information after being encrypted for protection thereof, but depending upon the necessity, in cases other than that. In the case where no such the control information is added with, the digital output does not provide the information, but except for the "Copy Free" information. The digital output provides the "Copy Free" information as it is, but outputs it with the quality limitation to be equal or less than 520,000 pixels, if the information is other than that.

When being unable to know the kind of the information, the control circuit 311 certificates that it is the board outside the regulation, and then no information is outputted even if being analogue or digital, but except for the "Copy Free" information. In this case, since no certify key is used, the security is lower in the level than the previous case, but in general, it is enough with this, in many cases.

In the explanation given in the above, in particular, in the case where no output is made from the output terminal of the apparatus, providing nothing to the display, but may be outputted a character information for indicating a fact that no output will be produced. Of course, it is also possible to make the character information appear during a time-period of an original predetermined regulation, and to distinguish it thereafter. An OSD (On Screen Display) for this purpose may be disposed between the output terminals 309, 310 and the switches 30809a, 30809B, etc., in the FIG. 4, for example, depending on the necessity, and it is controlled by the control circuit 311 or the like, thereby outputting the character information.

As was mentioned in the above, according to the present invention, it is possible to obtain an effect of dissolving the problem, that the video information outputted from the apparatus to an outside will be used in other purposes outside the original object, thereby affecting disadvantages to the copyright owner thereof. Further, if being applied into the board(s) of the PC, also an effect can be obtained that no anxiety comes out that those outputting methods are not observed by exchanging of the board.

While we have shown and described several embodiments in accordance with our invention, it should be understood that the present invention might be embodied in other specific forms without departing from the spirits or essential characteristics thereof. The present embodiment is therefore to be considered in all respects as illustrative and not restrictive, the scope of the present invention being indicated by the appended claims rather than by the foregoing description and range of equivalency of the claims are therefore intended to be embraced therein.

What is claimed is:

1. A video information outputting apparatus, for outputting either one of digital video information inputted and digital video information reproduced from a storage medium, comprising:
   a control information detector configured to detect control information and to add said control information to said digital video information, said control information including at least copy control information;
   an output portion configured to output said digital video information to an external apparatus;
   a controller configured to control outputs at said output portion depending upon the control information detected in said control information detector;
   wherein said controller is adapted to reduce resolution of said video information if said digital video information is outputted without protection and either one of limitation on copying and protection of video is indicated by said control information.

2. A video information outputting apparatus, as described in the claim 1, wherein said controller selects either one of said output portion and a second output portion depending upon said control information, wherein said second output portion is configured to convert said digital video information into analogue video signals and to output said analogue video signals to said external apparatus, and said controller selects said digital video information or said analogue video information, thereby outputting them.

3. A video information outputting apparatus, for outputting either one of digital video information inputted and digital video information reproduced from a storage medium, comprising:
   a control information detector configured to detect control information and to add said control information to said digital video information, said control information including at least copy control information;
   an output portion configured to output said digital video information to an external apparatus;
   a controller configured to control outputs at said output portion depending upon the control information detected in said control information detector if either one of limitation on copying and protection of video is indicated by said control information,
   wherein said controller selects either one of said output portion and a second output portion depending upon said control information, wherein said second output portion is configured to convert said digital video information into analogue video signals and to output said analogue video signals to said external apparatus, and said controller selects said digital video information or said analogue video information, thereby outputting them; and
   wherein after stopping an output at one of said first output portion and said second output portion depending upon said control information, said controller starts an output at the other after elapsing a predetermined time period;
   wherein said controller is adapted to reduce resolution of said video information if said digital video information is outputted without protection and either one of limitation on copying and protection of video is indicated by said control information.

4. A video information outputting apparatus, as described in the claim 3, wherein said controller reduces resolution of said analogue video information provided from said second output portion if either one of limitation on copying and protection of video information is indicated by said control information.

5. A video information outputting apparatus, as described in the claim 3, wherein said information protector protects the digital video information outputted from said first output portion by means of scrambling.

6. A video information outputting apparatus, as described in the claim 3, wherein said digital video information outputted from said first output portion and said analogue video information outputted from said second output portion are a RGB format signal.

7. A video information outputting apparatus, as described in the claim 3, wherein said digital video information outputted from said first output portion and said analogue video information outputted from said second output portion are outputted from a same connector.

8. A video information outputting apparatus for outputting to an external apparatus either one of digital video information inputted and digital video information reproduced from a storage medium, comprising:
   a control information detector which detects control information added to said digital video information;
   an output portion configured to output said digital video information to said external apparatus;
   a condition certification portion which certifies a condition of either one of said output portion and said external apparatus; and
   an output controller configured to control outputs at said first video output portion and said second video output portion , wherein
   said output controller controls said output portion depending upon the control information detected in said control information detector and the condition of either one of the external apparatus and the output portion certified in said condition certification portion if either one of limitation on copying and protection of video is indicated by said control information;
   wherein said controller is adapted to reduce resolution of said video information if said digital video information is outputted without protection and either one of limitation on copying and protection of video is indicated by said control information.

9. A video information outputting apparatus, as described in the claim 8, wherein said control information includes at least an information relating to either one of copy limitation of said digital video information and protection of said video information.

10. A video information outputting apparatus, as described in the claim 9, wherein said output controller prohibits an output from said output portion, when the condition of either one of said external apparatus and said output portion cannot be certificated, and if either one of limitation on copying and protection of video information is indicated by said control information.

11. A video information outputting apparatus, as described in the claim 8, wherein certification of the condition of either one of said external apparatus and said output portion in said condition certification portion contains a certificate with using a key signal between said external apparatus and said output portion.

12. A video information outputting apparatus, as described in the claim 8, wherein said output portion has: a first output portion which outputs said digital video information; a second output portion which converts said digital video information into analogue video signals and outputs said analogue video signals, and the condition of said output portion includes from which output portion the output is provided.

13. A video information outputting apparatus, as described in the claim 8, wherein said output portion has a function of outputting said digital video information with protection thereon, and the condition of said output portion includes whether the output is provided with the protection or not.

14. A video information outputting method executed by a video information outputting apparatus for outputting either of digital video information inputted and digital video information reproduced from a storage medium, to an external apparatus, comprising:
  detecting control information added to said digital video information;
  certificating a condition of either one of output and said external apparatus;
  controlling an output portion, upon basis of said control information detected and the condition certificated, and
  reducing the resolution of said video information if said digital video information is outputted without protection and either one of limitation on copying and protection of video is indicated by said control information,
  wherein said output portion is configured to output said digital video information to an external apparatus.

15. A video information outputting method as described in the claim 14, wherein said control information is that relating to either one of copy limitation of said digital video information and protection of said video information.

16. A video information outputting method as described in the claim 15, wherein an output is prohibited, when the condition of either one of output and said external apparatus cannot be certificated, and if either one of limitation on copying and protection of video information is indicated by said control information.

17. A video information outputting method as described in the claim 14, wherein said step for certificating the condition contains a certification with using a key.

18. A video information outputting method as described in the claim 14, wherein said output contains therein a function of outputting said digital video information and a function of converting said digital video information into analogue video signals and outputting said analogue video signals, and the condition of said apparatus includes the information of which one is outputted therefrom.

19. A video information outputting method as described in the claim 14, wherein the output contains therein a function of outputting said digital video information with protection thereon, and the condition of said output contains a condition whether the output is provided with protection thereon or not.

20. A video information transmitting method executed by a video information outputting apparatus for transmitting digital video information toward an information outputting apparatus for inputting information and outputting it to an external apparatus, comprising the following steps:
  adding control information in relation with either one of copy limitation of said digital video information and protection of video information to said digital video information to be transmitted;
  controlling an output portion depending on said control information, said output portion configured to output said digital video information to an external apparatus, and
  reducing the resolution of said video information if said digital video information is outputted without protection and either one of limitation on copying and protection of video is indicated by said control information;
  wherein said control information is used for controlling said output portion of said digital video information, being combined with a result of certification of either one of said information outputting apparatus and said external apparatus, when said digital video information is outputted from said information outputting apparatus to said external apparatus.

* * * * *

UNITED STATES PATENT AND TRADEMARK OFFICE
CERTIFICATE OF CORRECTION

PATENT NO. : 7,587,126 B2  Page 1 of 1
APPLICATION NO. : 10/100484
DATED : September 8, 2009
INVENTOR(S) : Okamoto et al.

It is certified that error appears in the above-identified patent and that said Letters Patent is hereby corrected as shown below:

Title Page:

In the bibliographic data at [75] Inventors,

"Hitaoki Owashi, Yokohama (JP)"

should read,

-- Hitoaki Owashi, Yokohama (JP) --

Signed and Sealed this

Ninth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7587,126 B2
APPLICATION NO. : 10/100484
DATED : September 8, 2009
INVENTOR(S) : Okamoto et al.

It is certified that error appears in the above-identified patent and that said Letters Patent is hereby corrected as shown below:

Claim 3, Column 15, Line 56, please delete "an output portion configured to output said digital video" and insert --a first output portion configured to output said digital video--.

Claim 3, Column 15, Line 58, please delete "a controller configured to control outputs at said output" and insert --a controller configured to control outputs at said first output--.

Claim 3, Column 15, Line 63, please delete "wherein said controller selects either one of said output" and insert --wherein said controller selects either one of said first output--.

Claim 8, Column 16, Line 45, please delete "first video output portion and said second video".

Signed and Sealed this

Fourth Day of May, 2010

David J. Kappos
*Director of the United States Patent and Trademark Office*